(12) United States Patent
Biswas et al.

(10) Patent No.: US 8,658,100 B2
(45) Date of Patent: Feb. 25, 2014

(54) PRESSURE RELIEF IN HIGH PRESSURE PROCESSING SYSTEM

(75) Inventors: Goutam Biswas, Danville, CA (US); Darush Farshid, Larkspur, CA (US); Lucy Wu, Albany, CA (US); James Knight, Gautier, MS (US); David Bosi, Napa, CA (US); Michael K. Porter, Cypress, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 481 days.

(21) Appl. No.: 12/917,284

(22) Filed: Nov. 1, 2010

(65) Prior Publication Data

US 2012/0103866 A1    May 3, 2012

(51) Int. Cl.
*B01J 8/00*    (2006.01)

(52) U.S. Cl.
USPC ........... 422/117; 422/141; 422/608; 422/620; 422/630

(58) Field of Classification Search
USPC ......... 422/117, 118, 141, 142, 600, 608, 618, 422/620, 622, 630, 631
See application file for complete search history.

(56) References Cited

U.S. PATENT DOCUMENTS

| | | | | |
|---|---|---|---|---|
| 3,207,688 A | * | 9/1965 | Van Driesen | 208/59 |
| 3,640,816 A | * | 2/1972 | Bull et al. | 208/416 |
| 4,444,214 A | * | 4/1984 | Paul, Jr. | 137/68.28 |
| 4,476,097 A | * | 10/1984 | Van Pool et al. | 422/112 |
| 2009/0057195 A1 | * | 3/2009 | Powers et al. | 208/59 |

OTHER PUBLICATIONS

Center for Chemical Process Safety of the American Institute of Chemical Engineers. Guidelines for Design Solutions for Process Equipment Failures. 1998. pp. 186-187.*

* cited by examiner

*Primary Examiner* — Jennifer A Leung

(57) ABSTRACT

The present disclosure provides a system and method for responding to an unintended increase in pressure within a high pressure processing system. The system and method of the present disclosure provides a pressure relief system that releases pressure reliably even if the material under pressure is of mixed phase. In addition, the system and method for releasing pressure avoids the need for complex subsystems to contain and process materials that escape the system during the pressure release process.

2 Claims, 2 Drawing Sheets

PRESSURE RELIEF IN HIGH PRESSURE PROCESSING SYSTEM

TECHNICAL FIELD

The present disclosure provides a system and method for protecting refining equipment from pressure build-up.

BACKGROUND

Hydrocracking is a major source of jet fuel, diesel, naphtha, and liquefied petroleum gas. Hydrocracking is a catalytic cracking process assisted by the presence of an elevated partial pressure of hydrogen gas. The process is operated at high temperatures (e.g., 600 to 900 degrees Fahrenheit) and high pressures (e.g., 1000-3500 pounds per square inch). The process involves flowing materials through a number of structures (e.g., flow control valves, pipes, etc.) any one of which can become clogged, jammed, or otherwise cause a constriction in flow that results in undesirable elevation of pressure within the system. To prevent the elevated pressure from damaging components in the system, pressure relief systems and methods have been developed. The present disclosure provides an improved pressure relief system and method that is useful in high pressure systems and processes, including refining systems and processes.

SUMMARY

The present disclosure provides a system and method for responding to an unintended increase in pressure within a high pressure processing system. In one embodiment system and method of the present disclosure provides a pressure relief system that releases pressure reliably even if the material under pressure is of mixed phase. In another embodiment, the system and method for releasing pressure avoids the need for complex subsystems to contain and process materials that may escape the system during the pressure release process.

DETAILED DESCRIPTION

Figure 1:
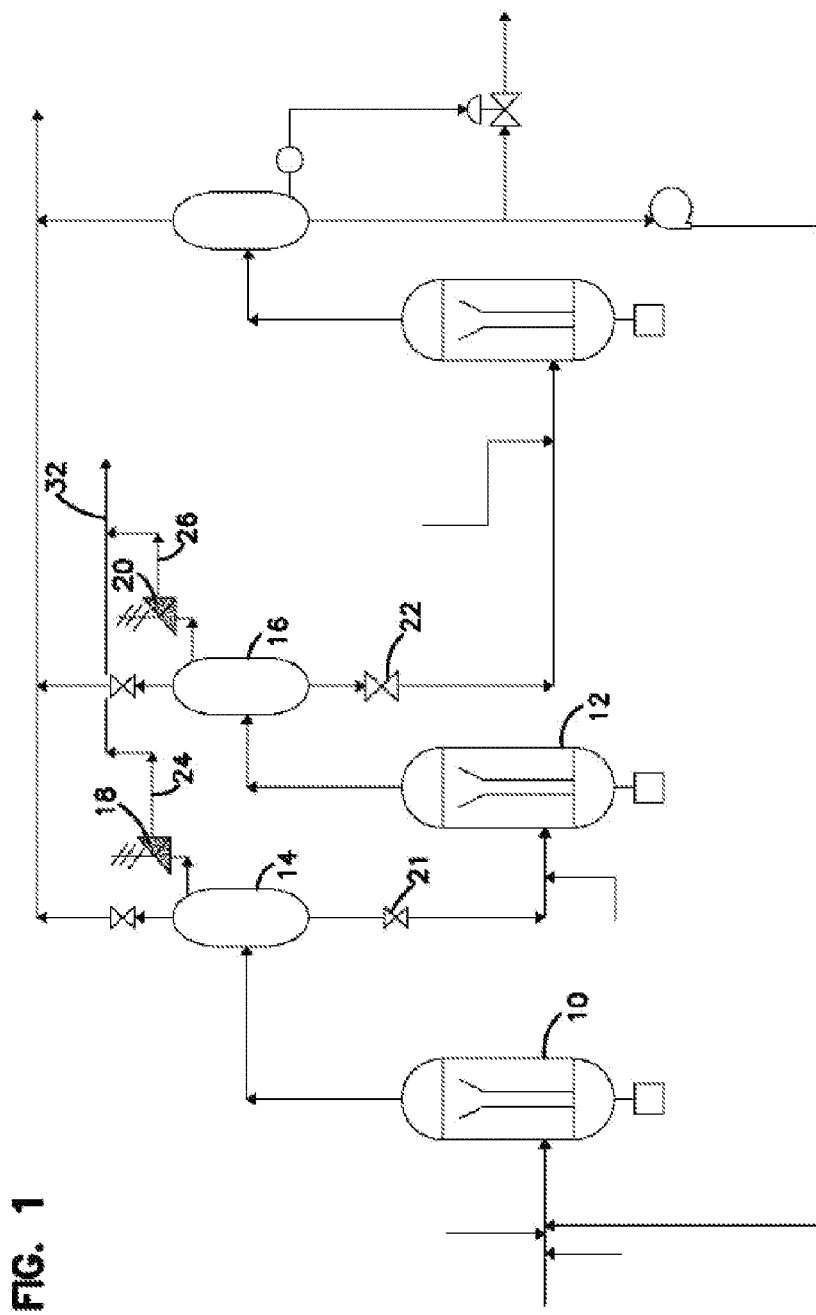
FIG. 1 is a schematic showing a hydrocracking process with a conventional pressure relief system.

Referring to FIG. 1 a reactor system having a conventional pressure relief valve based system for addressing unexpected increases in pressure in a high pressure, high temperature process is shown. The example high pressure, high temperature system is a hydrocracking process. In the hydrocracking process the material being processed is a mixture of gas, liquid, and solids comprising primarily a catalyst. The mixture is referred to herein as a slurry. As a mixed phase flow, the slurry is particularly susceptible to jams and buildups that constrict flow thereby resulting in unintended upstream pressure increases.

In the depicted conventional system, the first two reactors 10 and 12 and first two interstage separators 14 and 16 have conventional pressure relief devices 18 and 20 arranged to protect the interstage separators and upstream equipment (e.g., piping and instruments). In the event of a valve jam or other flow constriction or blockage (e.g., blockage at valve 21 or 22), pressures upstream of the valve will rapidly increase. Once the pressure reaches a threshold level, the pressure relief devices 18 and 20 are actuated and allow flow through lines 24 and 26 into line 32. Line 32 directs the flow to a downstream flare header system (not shown). The entire downstream flare header system needs to be designed to handle the high temperature (600° F.-850° F.) mixed phased hazardous material as it exits the system (e.g., the stack height and burner design needs to accommodate the high temperature vapor being discharged via line 32) In the high pressure mixed phase processing system, the conventional system requires complex downstream subsystems for containing and handling the material exiting the relief valve.

Figure 2:
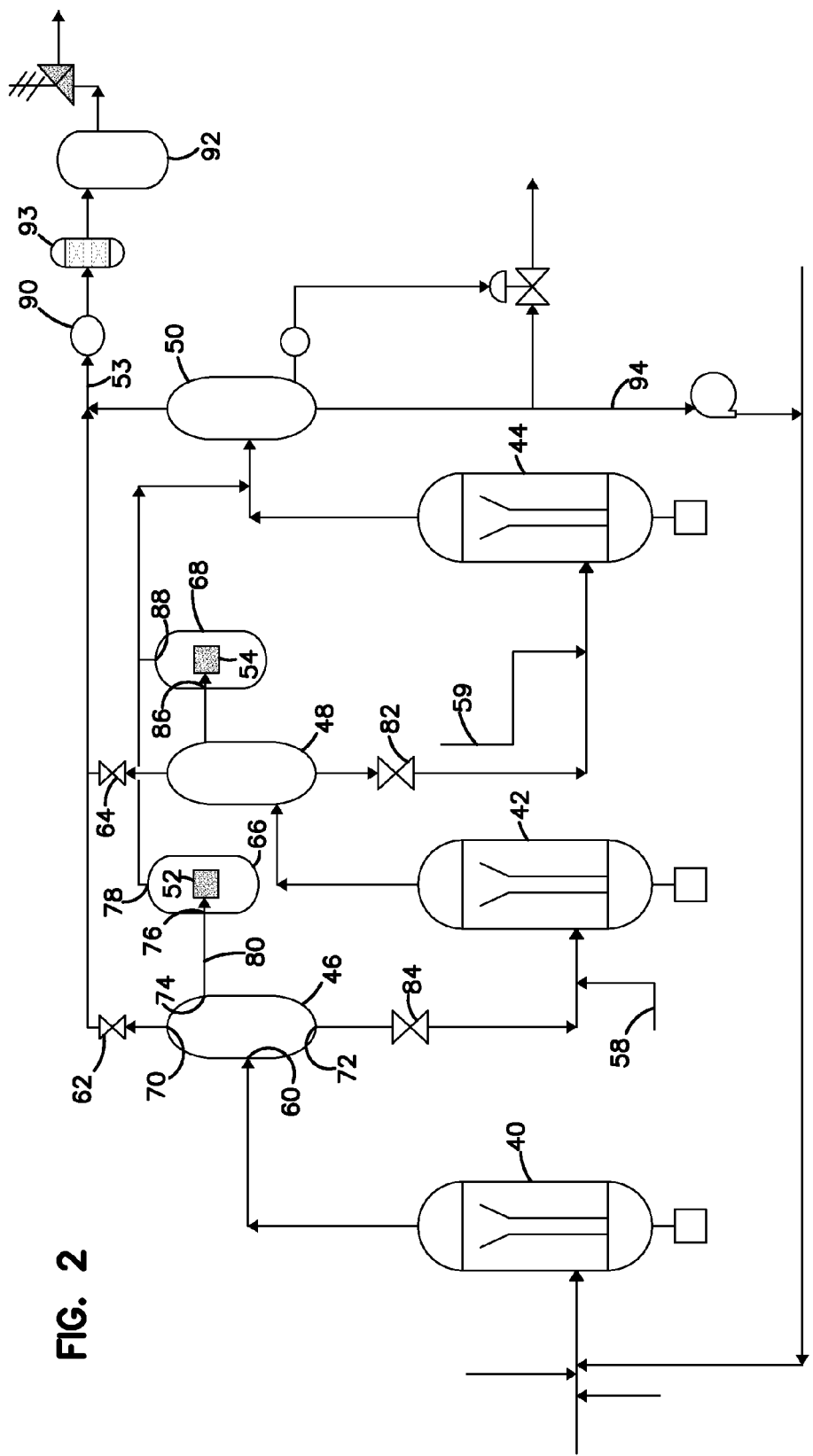
FIG. 2 is a schematic showing a hydrocracking process with a pressure relief system according to the principles of the present disclosure.

Referring to FIG. 2, one embodiment of the systems and methods applying the principles of the present disclosure is shown. FIG. 2 illustrates a hydrocracking process with an improved pressure relief system. The process relieves pressures that result from a flow constriction condition while avoiding the need for complex downstream subsystems for containing and handling high pressure hot mixed phased substances. In one aspect of the invention, the process includes providing a plurality of high pressure reactors 40, 42, 44 arranged in series for processing a slurry; providing separators 46, 48 connected between high pressure reactors 40, 42, 44 configured to separate vapors from the slurry; and providing a relief system wherein a rupture disk 52, 54 is designed to actuate or rupture in response to a flow constraint condition, which allows fluid to flow from the separators 46, 48 to a downstream high pressure system thereby relieving undesirable upstream pressure.

In the embodiment depicted in FIG. 2, the process further comprises a last downstream separator 50 positioned downstream of the downstream a last high pressure reactor 44 of the plurality of high pressure reactors 40, 42, 44. The last downstream separator 50 is in fluid communication with a downstream fluid path 53 that is free of flow valves and is substantially free of slurry or conveys very low amounts of slurry. Given that the downstream fluid path 53 is free of flow valves and slurry, it is unlikely that the flow in path 53 will be constricted or blocked. In the depicted embodiment the pressure in the downstream fluid path 53 is less than the pressure in any one of the plurality of high pressure reactors 40, 42, 44, and is substantially equal to the pressure in the downstream most separator 50. In the depicted embodiment the pressure in the downstream fluid path 53 is slightly less than the pressure in the downstream most separator 50 due to friction pressure loss in the system (e.g., within 15 pounds per square inch, within 10 pounds per square inch, etc.).

In the depicted embodiment, the pressure in the plurality of high pressure reactors 40, 42, 44 decreases in a downstream direction. For example, the pressure in reactor 40 might be 2500 pounds per square inch, the pressure in reactor 42 might be 2450 pounds per square inch, and the pressure in reactor 44 might be 2400 pounds per square inch. Likewise, the pressure in the separators 46, 48 between the high pressure reactors 40, 42 also decreases in a downstream direction.

In the depicted embodiment the high pressure reactors 40, 42, 44 convert a portion of the unconverted oil to lower boiling point hydrocarbons, thereby creating a mixture of unconverted oil, hydrogen, converted oil and slurry catalyst. In the various embodiments of the invention the high pressure reactors include reactors such as a hydro-conversion slurry reactor, a circulating slurry bed reactor, an ebullating bed reactor, a coal to liquid reactor and a trickle flow fixed bed reactor. It should be appreciated that the foregoing list of high-pressure reactors is nonexclusive and that many alternative high pressure reactors are possible. In the depicted embodiment the separators 46, 48 are configured to separate lighter oil and hydrogen into vapor while permitting heavier converted and unconverted oil and slurry catalyst to flow downstream into a high pressure reactor of the plurality of high pressure reactors 40, 42, 44.

In the depicted embodiment, when the system is operating normally (i.e., no flow constriction or blockage that causes unexpected pressure increases), the slurry exiting the separators 46, 48 is mixed with additional hydrogen via hydrogen lines 58, 59 before entering the downstream high pressure reactor 42, 44. In addition, the vapor from the separator is routed downstream through flow valves 62, 64 under differential pressure control.

In the depicted embodiment a method of protecting any high pressure reactor system is provided. The method generally includes providing a rupture disk 52 within a high pressure chamber 66 that is in fluid communication with a processing chamber 46 configured to operate at pressure in excess of 1000 pounds per square inch (e.g., pressure between 1000-3500 pounds per square inch). The pressure in the high pressure chamber on a first side of the rupture disk 52 can be different than the pressure in the high pressure chamber on a second side of the rupture disk. For example, the pressure on a first side of the rupture disk 52 and in the processing chamber 46 might be at 2450 pounds per square inch, and on a second side of the rupture disk 52 the pressure might be at 2400 pounds per square inch. The rupture disk 52 can be configured to automatically rupture when the pressure difference between the first side and second side of the high pressure chamber is between 100-400 pounds per square inch. For example, in the example above the rupture disk may be configured to automatically rupture at 200 pounds per square inch. In other words, if the pressure on the second side is 2400 pounds per square inch, the rupture disk would automatically rupture when the pressure in the processing chamber is greater than or equal to 2600 pounds per square inch. When the rupture disk ruptures, flow is directed from the processing chamber 46 through the high pressure chamber 66 to a downstream high pressure system that has a pressure of at least 500 pounds per square inch (e.g., 2000 pounds per square inch, 1500 pounds per square inch, 1000 pounds per square inch, etc.). For example, a downstream pressure in the above example system might be 1500 pounds per square inch.

Still referring to FIG. 2, the configuration of a reactor system according to the present disclosure is further described. In the depicted embodiment the system includes a separator 46 constructed to operate at pressure in excess of 1000 pounds per square inch and temperature greater than 600 degrees Fahrenheit. The separator 46 includes at least one inlet (e.g., inlet 60) and at least two outlets (e.g., three outlets 70, 72, 74). At least one of the outlets is a vapor outlet (e.g., 70). The system includes a pressure vessel 66 including an inlet 76, an outlet 78, and a rupture disk 52 that is configured to block flow entering the pressure vessel 66 from the inlet 76 from exiting the pressure vessel through the outlet 78. The system includes a fluid path 80 between the vapor outlet 74 of the separator 46 and the rupture disk 52 in the pressure vessel 66. The fluid path is open to the separator 46. The system further includes a flow control valve 62, 84 positioned in a fluid path downstream from one of the at least two outlets 70, 72, 74 of the separator 46.

As discussed above, the separator 46 is configured to separate lighter oil and hydrogen into vapor while permitting heavier converted and unconverted oil and slurry catalyst to flow through the flow control valve 84 positioned in a fluid path downstream from the outlet 72 of the separator 46. In the depicted embodiment the system also includes a reactor 40 positioned upstream of the separator 46 such that fluid from the reactor flows into the inlet 60 of the separator 46. As discussed above, the reactor in the depicted embodiment could be, for example, a hydro-conversion slurry reactor, ebullating bed reactor, coal to liquid reactor, or trickle flow fixed bed reactor.

In the depicted embodiment the system includes a second reactor 42 positioned downstream of the flow control valve 84, and a second separator 48 in fluid communication with the second reactor 42. In the depicted embodiment the second separator 48 is in fluid communication with a second pressure vessel 68, which includes an inlet 86, an outlet 88, and a rupture disk 54. The rupture disk 54 is configured to block flow entering the pressure vessel 68 from the inlet 86 from exiting the pressure vessel 68 through the outlet 88 unless the rupture disk 54 is ruptured. In the depicted embodiment, hot hydrogen is directed to either side of the rupture disk to keep the disk warm to ensure reliable operations.

In the depicted embodiment the system further includes a third reactor 44 positioned downstream of the second separator 48 and a third separator 50 in fluid communication with the third reactor 44. In the depicted embodiment the third separator 50 is also in fluid communication with the outlet 78 of the first pressure vessel 66 and the outlet 88 of the second pressure vessel 68. The third separator 50 is similar to the first separator 46 and second separator 48 in that it is also configured to separate out the vapors from the flow. The vapor that exits the third separator 50 is directed to downstream processing equipment that includes such components as a heat exchanger (i.e., cooler) 90, in-line hydrotreater reactor 93, and low temperature separator 92 without downstream flow control valves. The non-vapor materials (e.g., unconverted oil and slurry) are directed back via path 94 to the first reactor 40 or to other refining processes selected from the group consisting of: atmospheric distillation, vacuum distillation, delayed coking and combinations thereof.

It should be appreciated that the term fluid or flow is used herein to refer to any substance that can flow including, but not limited to, vapors, liquids, particles, and slurries. In addition, the term flow valves is used herein to refer to any valve that can control or block the flow of fluid including, but not limited to, block valves and level control valves.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A reactor system comprising:
   at least one reactor in fluid communication with a separator comprising an inlet and at least two outlets, wherein at least one of the outlets is a vapor outlet;
   a first pressure vessel comprising an inlet, an outlet and a rupture disk disposed within the first pressure vessel;
   a first fluid path between the at least one vapor outlet of the separator, the inlet of the first pressure vessel and the rupture disk disposed within the first pressure vessel, wherein the first fluid path is open to the separator; and
   a flow control valve positioned in a second fluid path downstream from one of the at least two outlets of the separator;
   wherein:
   (a) the separator receives a converted and unconverted discharge mixture from the at least one reactor to form a light fraction and a heavy fraction wherein the heavy fraction passes through the flow control valve positioned in the second fluid path downstream from one of the at least two outlets of the separator;

(b) the at least one reactor includes a first reactor positioned upstream of the separator such that fluid from the first reactor flows into the inlet of the separator, wherein the first reactor is selected from the group consisting of: hydroprocessing reactor, hydrocracking reactor, hydro-conversion slurry reactor, ebullating bed reactor, circulating slurry bed reactor, coal to liquid reactor, expanded bed reactor and trickle flow fixed bed reactor;

(c) the at least one reactor includes a second reactor positioned downstream of the flow control valve, wherein the second reactor is selected from the group consisting of: hydroprocessing reactor, hydrocracking reactor, hydro-conversion slurry reactor, ebullating bed reactor, circulating slurry bed reactor, coal to liquid reactor, expanded bed reactor and trickle flow fixed bed reactor;

(d) the reactor system further comprises a second separator in fluid communication with the second reactor, wherein the second separator is in fluid communication with a second pressure vessel including an inlet, an outlet and a rupture disk disposed within said second pressure vessel;

(e) the at least one reactor includes a third reactor positioned downstream of the second separator, wherein the third reactor is selected from the group consisting of: hydroprocessing reactor, hydrocracking reactor, hydro-conversion slurry reactor, ebullating bed reactor, circulating slurry bed reactor, coal to liquid reactor, expanded bed reactor and trickle flow fixed bed reactor;

(f) the reactor system further comprises a third separator in fluid communication with the third reactor, wherein the third separator is in fluid communication with the outlet of the first pressure vessel and the outlet of the second pressure vessel, wherein the third separator receives a converted and unconverted discharge mixture from the third reactor to form a third light fraction and a third heavy fraction wherein the third light fraction is directed to downstream processing equipment selected from the group consisting of: exchangers, in-line hydrotreater reactors and separators without flow control valves; and (g) the reactor system further comprises a third fluid path that directs the third heavy fraction to the first reactor or, optionally, to other refining processes selected from the group consisting of: atmospheric distillation, vacuum distillation, delayed coking and combinations thereof.

2. The reactor system of claim 1, wherein the light fraction includes lighter oil and hydrogen and the heavy fraction includes heavier oil and slurry catalyst.

\* \* \* \* \*